United States Patent
Dupont et al.

(10) Patent No.: US 8,181,444 B2
(45) Date of Patent: May 22, 2012

(54) SOLID PROPELLANT ROCKET MOTOR WITH NOTCHED ANNULAR FUEL

(75) Inventors: James H. Dupont, Bowie, AZ (US); Richard D. Loehr, Tucson, AZ (US); Robert N. Renz, Phoenix, AZ (US)

(73) Assignee: Raytheon Company, Waltham, MA (US)

( * ) Notice: Subject to any disclaimer, the term of this patent is extended or adjusted under 35 U.S.C. 154(b) by 905 days.

(21) Appl. No.: 12/240,223

(22) Filed: Sep. 29, 2008

(65) Prior Publication Data
US 2010/0077723 A1 Apr. 1, 2010

(51) Int. Cl.
*F02K 9/00* (2006.01)
(52) U.S. Cl. .................. 60/253; 60/251; 60/219; 60/234
(58) Field of Classification Search .................... 60/253, 60/254, 255, 256, 219, 250, 251, 244, 245, 60/224, 225
See application file for complete search history.

(56) References Cited

U.S. PATENT DOCUMENTS

| | | | |
|---|---|---|---|
| 2,434,652 A * | 1/1948 | Hickman | 60/39.47 |
| 2,952,876 A * | 9/1960 | Miles | 425/309 |
| 2,987,882 A * | 6/1961 | Nocke | 60/255 |
| 3,064,423 A * | 11/1962 | Frey | 60/39.47 |
| 3,066,481 A * | 12/1962 | George et al. | 60/255 |
| 3,088,273 A * | 5/1963 | Adelman et al. | 60/253 |
| 3,144,829 A * | 8/1964 | Fox | 60/253 |
| 3,257,805 A * | 6/1966 | Gevelhoff | 60/256 |
| 3,260,208 A * | 7/1966 | Schluter | 60/250 |
| 3,266,240 A | 8/1966 | Kurylko et al. | |
| 3,379,178 A * | 4/1968 | Boyars et al. | 122/247 |
| 3,407,736 A * | 10/1968 | Beuschel | 102/291 |
| 3,421,325 A * | 1/1969 | Thibodaux, Jr. | 60/255 |
| 3,677,010 A * | 7/1972 | Fink et al. | 60/220 |
| 3,700,762 A * | 10/1972 | Carpenter et al. | 264/3.1 |
| 3,703,080 A * | 11/1972 | Longwell | 60/219 |
| 3,782,112 A * | 1/1974 | Muzzy | 60/251 |
| 3,885,385 A * | 5/1975 | Nicastro et al. | 60/250 |
| 4,015,427 A | 4/1977 | Brooks | |
| 4,148,187 A * | 4/1979 | Younkin | 60/245 |
| 4,442,666 A * | 4/1984 | Vetter | 60/39.47 |
| 4,466,352 A * | 8/1984 | Dalet et al. | 102/288 |
| 4,574,700 A * | 3/1986 | Lewis | 102/287 |
| 4,821,511 A * | 4/1989 | Felix et al. | 60/255 |
| 5,491,973 A * | 2/1996 | Knapp et al. | 60/242 |
| 5,620,205 A * | 4/1997 | Lauritzen et al. | 280/741 |
| 5,623,115 A * | 4/1997 | Lauritzen et al. | 102/288 |
| 5,765,361 A * | 6/1998 | Jones et al. | 60/204 |
| 6,125,763 A * | 10/2000 | Kline et al. | 102/381 |
| 6,148,610 A * | 11/2000 | Calabro et al. | 60/250 |
| 6,431,072 B1 * | 8/2002 | Archer, Jr. | 102/284 |
| 7,003,942 B2 * | 2/2006 | Le Helley et al. | 60/219 |
| 2009/0205313 A1 * | 8/2009 | Cavalleri et al. | 60/255 |

* cited by examiner

*Primary Examiner* — William H Rodriguez
(74) *Attorney, Agent, or Firm* — Renner, Otto, Boisselle & Sklar, LLP

(57) ABSTRACT

A motor includes an annular solid fuel between an inside diameter and an outside diameter. The solid fuel has a series of radial notches that define segments of fuel between them. The notches allow for faster burning of the fuel, while still allowing structural integrity of the fuel segments to be retained during the burning process.

20 Claims, 2 Drawing Sheets

US 8,181,444 B2

SOLID PROPELLANT ROCKET MOTOR WITH NOTCHED ANNULAR FUEL

BACKGROUND OF THE INVENTION

1. Technical Field of the Invention

The invention is in the field of solid fuel motors.

2. Description of the Related Art

Various grain designs have been utilized in solid motors, including star grains, concentric grains, and single perforation grains. However, improvement in performance and other characteristics would still be desirable.

SUMMARY OF THE INVENTION

According to an aspect of the invention, a solid-fuel motor has an annular fuel with notches dividing the fuel into multiple teeth or segments, each having a circumferential face that forms part of an inner diameter of the annular fuel.

According to another aspect of the invention, a cylindrical annular fuel encloses an unobstructed flow area that has a cross sectional area that is greater than the cross sectional area of the fuel. The annular fuel is a solid fuel that may have a series of notches dividing the fuel into teeth or segments. All of the teeth or segments may be joined together by an outer unnotched ring of fuel that may be bonded to a cylindrical case. The unobstructed flow area may allow for high mass flow rates without choking of the flow.

According to yet another aspect of the invention, a motor includes: a casing; and an annular solid fuel within the casing, the annular solid fuel having an inner diameter and an outer diameter about an axis of the casing. The annular solid fuel has a notched configuration, with notches between segments of fuel. The segments each have an inner face along the inner diameter. The inner face has a circumferential extent, and is all substantially equidistant from the axis.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

A motor includes an annular solid fuel between an inside diameter and an outside diameter. The solid fuel has a series of radial notches that define segments of fuel between them. The notches allow for faster burning of the fuel, while still allowing structural integrity of the fuel segments to be retained during the burning process.

Figure 1:
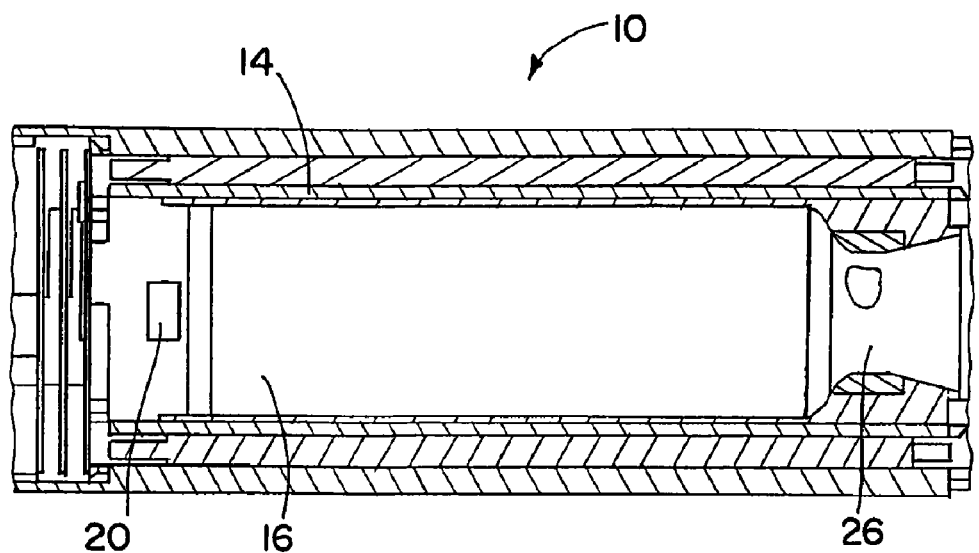
FIG. 1 is a cross sectional view of a boost motor in accordance with an aspect of the present invention.
Figure 2:
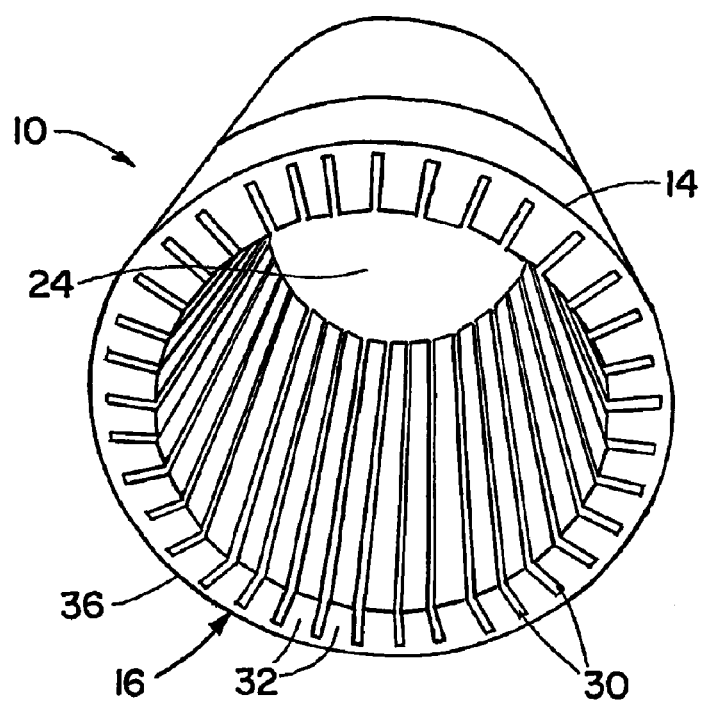
FIG. 2 is a perspective view of an interior of the boost motor of FIG. 1, showing an annular fuel having notches therein which divide the fuel into multiple segments or teeth.

Referring initially to FIGS. 1 and 2, a boost motor 10 is used for delivering a high impulse (thrust×time) in a short time period. The boost motor 10 may be part of an airborne defense interceptor used for intercepting incoming missiles or projectiles, although it will be appreciated that the motor 10 may have a wide variety of other uses. The boost motor 10 includes a case 14 and an annular fuel 16. The case 14 is a cylindrical case, such as made out of metal or composite or another suitable material. The annular fuel 16 is attached to an inner surface of the cylindrical case 14. An igniter 20 is used to ignite the annular fuel 16. This produces pressurized combustion gases that flow down a flow area 24 and out through a nozzle 26. The annular fuel 16 has an inner diameter that is relatively large compared to its outer diameter (the inner diameter of the case 14). For example, the inner diameter of the annular fuel 16 may be about 75% of the annular fuels outer diameter. This means that the flow area 24 may have an area that makes up 50% or more of the cross-sectional area enclosed by the case 14. The flow area 24 is substantially free of any material that would obstruct or impede the flow of pressurized gases through the boost motor 10. The boost motor 10 may thus be hollow with nothing but gas-filled empty space radially within the annular fuel 16. Having such a large unobstructed flow area 24 allows for rapid flow of pressurized gases along and out of the motor 10 without choking of the flow area prior to the nozzle throat.

The annular fuel 16 has a series of radial notches 30 that divide the annular fuel 16 into a series of segments 32. The notches 30 have a depth that is less than the thickness of the annular fuel 16. That is, the notches 30 do not extend all the way to the casing 14. Instead there is an unnotched ring of fuel 36 along the outer perimeter of the annular fuel 16. The unnotched ring of fuel 36 is bonded to the casing 14. The notches 30 serve to provide more surface area for combustion of the annular fuel 16. This increases the combustion rate of the annular fuel 16. The annular fuel 16 may have substantially the same cross section along a longitudinal (axially) axis of the motor 10. That is, the notches 30 and the segments 32 may have dimensions that do not change along the length of the annular fuel 16.

The annular fuel 16, having a cylindrical shape with a constant cross-sectional shape, is easy to fabricate. No complex tooling is required in order to achieve the constant-depth notches 30. The notches 30 may be formed by use of a broaching tool inserted into a machined propellant casting. The annular fuel 16 may be initially cast, and then machined to the correct dimensions. The notches 30 may then be formed using a broaching tool inserted into the annular fuel 16.

Examples of suitable material for the annular fuel 16 are Hipel 914a and 914b propellants. These propellants may be obtained from Pacific Scientific Energetic Materials Company of Valencia, Calif. A primary component of such propellants is ammonium perchlorate (AP). It will be appreciated that a wide variety of other propellant materials may alternatively be used.

Figure 3:
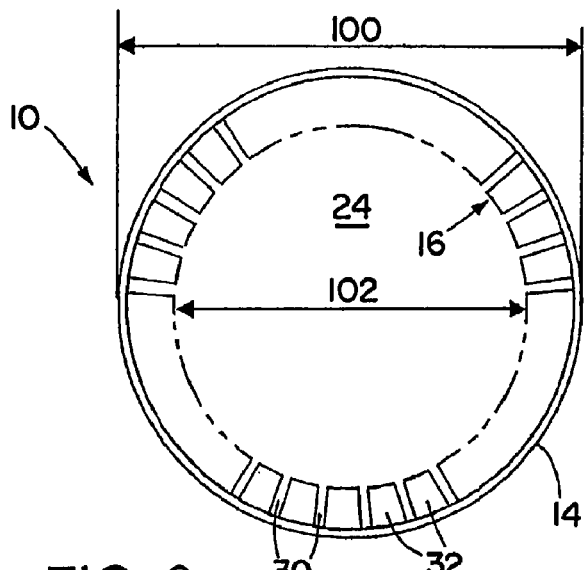
FIG. 3 is a cross sectional view illustrating dimensions of a specific embodiment of the annular fuel of FIG. 2.
Figure 4:
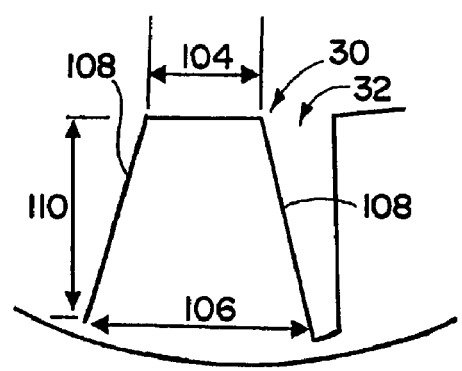
FIG. 4 is a detailed view of a few of the segments and notches illustrating further dimensions of a specific embodiment.
Figure 5:
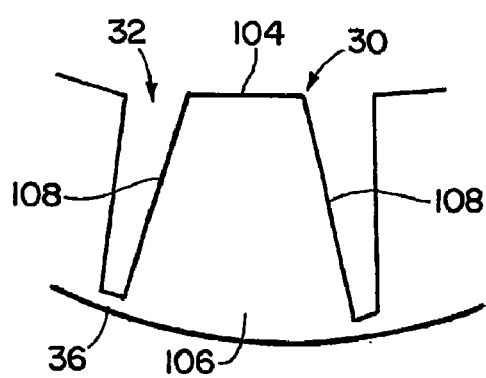
FIG. 5 is another detailed view of a few of the segments and notches.

FIGS. 3-5 show ranges of dimensions for one embodiment of the annular fuel 16. The dimensions given are examples only, and it will be appreciated that a wide variety of other suitable dimensions may alternatively be employed.

The annular fuel 16 has an outer diameter 100 of 5.08 cm (2 inches) and an inner diameter 102 of 3.81 cm (1.5 inches). The inner diameter 102 may be at least 75% of the outer diameter 100. The annular fuel 16 may have about 40 segments or teeth 32. More broadly, there may be from 16 to 64 segments or teeth 32. Segments or teeth 32 may be all substantially the same in configuration, and may be substantially axisymmetrically located about the annular fuel 16.

The notches 30 may have a substantially constant width throughout their depth. Alternatively the notches 30 may be angled, being wider at their tops, along top surfaces or inner faces 104 of the segments or teeth 32, than at their bottoms, along a base 106 of the segments or teeth 32. In doing so the side walls 108 of the teeth or segments 32 may be angled relative to a radial direction at an angle from 0 to 20°. The tooth end surface 104 may have a width of about 2.29 mm (0.09 inches), or more broadly may have a width from 1.27 mm (0.05 inches) to 3.25 mm (0.13 inches). The tooth base 106 may have a width of about 3.25 mm (0.13 inches) or more broadly from 2.29 mm (0.09 inches) to 4.32 mm (0.17 inches). The side surfaces 108 may have an exposed surface length of about 5.08 mm (0.20 inches), or more broadly from 2.54 mm (0.10 inches) to 7.62 mm (0.30 inches). This may be roughly the same range as for the depth 110 of the notches 30. An annular fuel thickness 114 at the bottoms of the notches 30 may be about 1.27 mm (0.05 inches).

The top tooth surface or inner face 104 may have a width or circumferential extent that is at least ⅔ of the width of the base 106. The width of the top surface 104 may be at least twice the width of the top of the notch 30. The exposed side surfaces 108 of the teeth or segments 32 may each be at least twice as long as the width of the top tooth surface 104. Thus the presence of the notches 30, dividing up the annular fuel 16 into the series of teeth or segments 32, may at least triple the exposed area of the annular fuel 16.

The inner face 104 may be curved, such as having a curvature on the same side of the face as the axis 10. A center of curvature of the inner face 104 may be at substantially the same location as the axis 10. Alternatively the inner face 104 may be flat.

The notches 30 may extend at least 90% of the way from the inner diameter of the annular fuel 16 to the outer diameter of the annular fuel 16. More particularly, the notches 30 may extend (have a depth in a radial direction) that is at least 95% of the way from the inner diameter of the annular fuel 16 to the outer diameter of the annular fuel 16.

The configurations of the notches 30, the segments 32, and the unnotched outer ring 36 may be such that the segments 32 remain attached to the outer ring 36 through substantially all of the burning process. It will be appreciated that this advantageously keeps the segments 32 in place to provide a maximal amount of pressurized gasses, and obviates the need for screens to keep broken-off pieces of fuel within the motor.

The igniter 20 may be a fast-acting igniter able to ignite the annular fuel in 2-3 milliseconds. The boost motor 10 may be capable of delivering a high impulse (for example, at least 190 lb-sec) from burning of the annular fuel 16 in a time within 50 milliseconds, or more narrowly within 30 milliseconds.

The motor burn rate for the annular fuel 16 is a function of the fuel material used, the surface burn area, and the operating pressure. The motor 10 advantageously provides a significant increase in propellant surface burn area relative to that of standard grain configurations, such as star grain configurations. The large unobstructed flow area 24 provides an ample cross sectional area to maximize mass flow of pressurized gases, and to inhibit choking of the internal flow.

The boost motor described above has several advantages over prior configurations. Compared with single perforation and star grain configurations, the notched grain motor described above provides significantly larger burn areas, allowing for significantly faster combustion for the same size of fuel. In addition the configuration described above provides a large unobstructed flow area for transporting pressurized gases through the motor and out of the nozzle. Configurations such as concentric grains require grain traps or other structures to support the grains. These other structures would cause choked or otherwise reduced performance due to restricted mass flow. No grain traps or other supports are required in the boost motor 10 described above, since the annular fuel 16 is bonded directly to the case 14, such as by use of a suitable adhesive.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A motor comprising:
a casing; and
an annular solid fuel within the casing, the annular solid fuel having an inner diameter and an outer diameter about an axis of the casing;
wherein the annular solid fuel has a notched configuration, with notches between segments of fuel;
wherein the segments each have an inner face along the inner diameter; and
wherein the inner face has a circumferential extent, and is all substantially equidistant from the axis; and
wherein the annular solid fuel encloses free area that has a greater cross-sectional area than a cross-sectional area of the annular fuel.

2. The motor of claim 1, wherein the notches are substantially axisymmetrically spread around the axis.

3. The motor of claim 1, wherein the notches extend from the inner diameter at least 75% of the way from the inner diameter to the outer diameter.

4. The motor of claim 3, wherein the notches extend less than 95% of the way from the inner diameter to the outer diameter.

5. The motor of claim 3, wherein the notches extend at least 90% of the way from the inner diameter to the outer diameter.

6. The motor of claim 1, wherein the inner face of one or more of the segments is flat.

7. The motor of claim 1, wherein the inner face of one or more of the segments is curved, with a center of curvature on the same side of the inner face as the axis.

8. The motor of claim 7, wherein the center of curvature is at substantially the same location as the axis.

9. The motor of claim 1, wherein the notches vary in width over their depth.

10. The motor of claim 1, wherein the notches have substantially constant width over depth.

11. The motor of claim 1, wherein the notches are all substantially identical to one another.

12. The motor of claim 1, wherein the free area is substantially fully unobstructed.

13. The motor of claim 1, wherein an outer surface of the annular fuel is attached to an inner surface of the casing.

14. The motor of claim 1, wherein the annular fuel includes an unnotched outer ring that the segments protrude inward from.

15. A motor comprising:
a casing; and
an annular solid fuel within the casing, the annular solid fuel having an inner diameter and an outer diameter about an axis of the casing;
wherein the annular solid fuel has a notched configuration, with notches between segments of fuel;
wherein the segments each have an inner face along the inner diameter; and
wherein the inner face has a circumferential extent, and is all substantially equidistant from the axis; and
wherein there are at least 16 notches.

16. The motor of claim 15, wherein the notches extend from the inner diameter at least 75% of the way from the inner diameter to the outer diameter.

17. A motor comprising:
a casing; and
an annular solid fuel within the casing, the annular solid fuel having an inner diameter and an outer diameter about an axis of the casing;
wherein the annular solid fuel has a notched configuration, with notches between segments of fuel;
wherein the segments each have an inner face along the inner diameter; and
wherein the inner face has a circumferential extent, and is all substantially equidistant from the axis; and
wherein an inner surface of the annular fuel has at least three times a surface burn area of an unnotched surface having a same inner diameter as that of the annular fuel.

18. The motor of claim 17,
wherein substantially all of the segments have substantially the same shape;
wherein substantially all of the notches have substantially the same shape; and
wherein the circumferential extent of the inner face of each segment is at least twice an adjoining width at tops of the notches, where the notches meet the inner diameter.

19. The motor of claim 17,
wherein substantially all of the segments have substantially the same shape;
wherein substantially all of the notches have substantially the same shape; and
wherein exposed side surfaces of the segments are at least twice the circumferential extent of the inner face of each segment.

20. The motor of claim 17,
wherein substantially all of the segments have substantially the same shape;
wherein substantially all of the notches have substantially the same shape; and
wherein the circumferential extent of the inner face of each segment is at least ⅔ of a width at bases of the segments.

* * * * *